Jan. 18, 1938. W. J. ZENNER Re. 20,626
TAPE ACTUATING DEVICE
Original Filed Feb. 10, 1932
FIG. 2
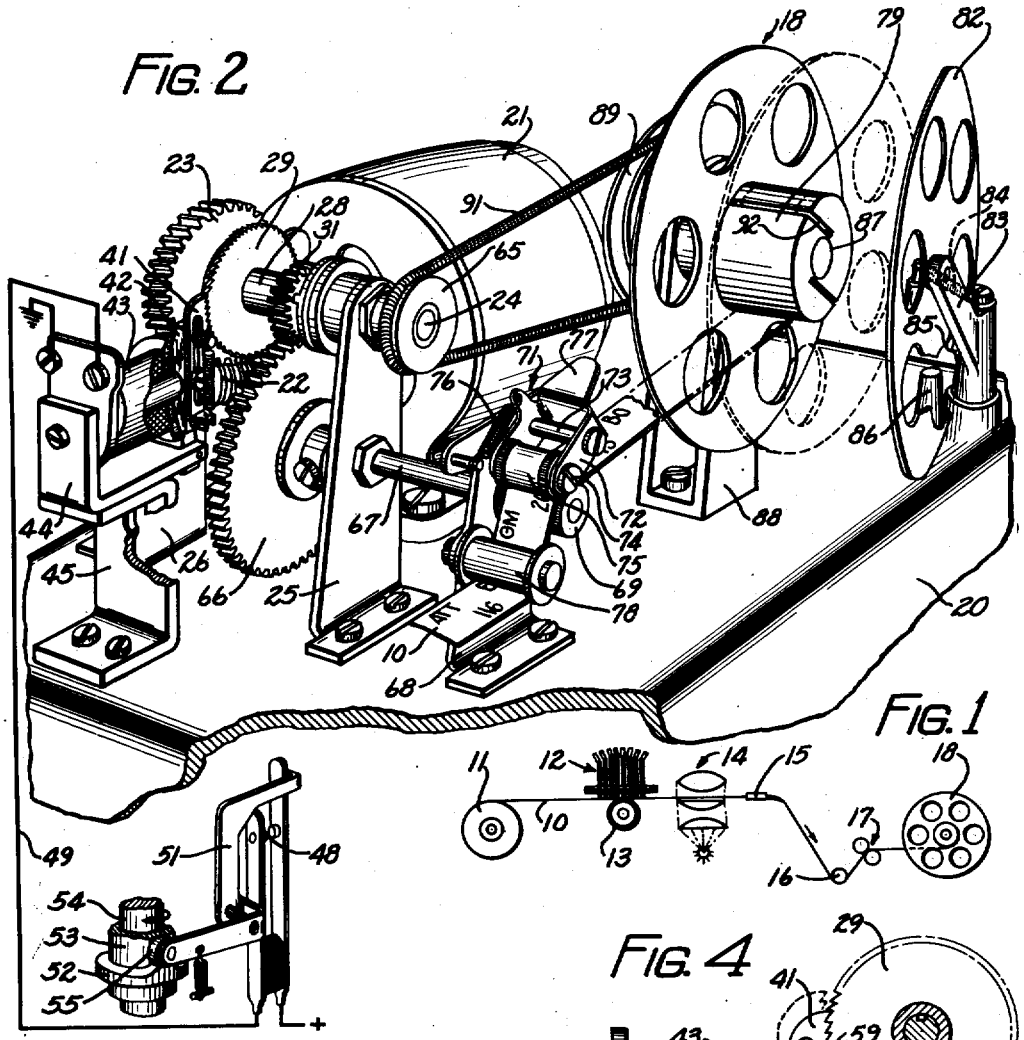
FIG. 1
FIG. 4
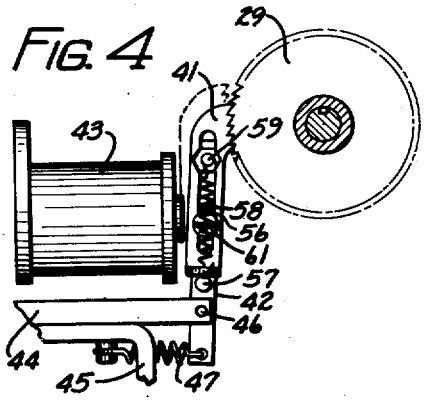
FIG. 3
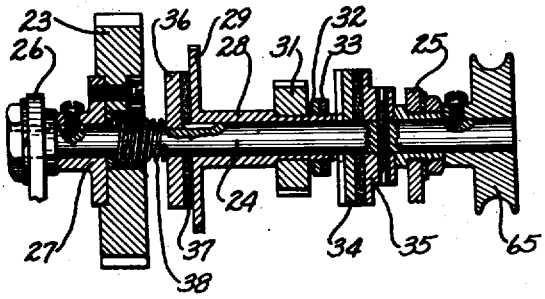
INVENTOR
WALTER J. ZENNER
BY N. B. Whitfield
ATTORNEY Reissued Jan. 18, 1938

Re. 20,626

UNITED STATES PATENT OFFICE 20,626

TAPE ACTUATING DEVICE

Walter J. Zenner, Des Plaines, Ill., assignor to Teletype Corporation, Chicago, Ill., a corporation of Delaware Original No. 1,973,839, dated September 18, 1934, Serial No. 592,006, February 10, 1932. Application for reissue March 20, 1935, Serial No. 12,103

34 Claims. (Cl. 178—42)

This invention pertains to projection systems and apparatus therefor and more particularly to tape actuating devices of the type employed for imparting continuous movement to the paper strip through telegraph recording devices and projecting machines.

It has been found to be desirable in many brokerage offices to project upon a screen the information received upon a ticker tape, so as to accommodate simultaneously a greater number of observers. To accomplish this result a transparent or translucent tape is utilized, and subsequent to printing or recording thereon the tape is caused to pass through a projection machine. It is well known that normally the movement of the tape through the recording device or ticker is controlled by a so-called spacing mechanism integral with the device and that intermittent or step-by-step motion is thereby imparted to the tape. Such irregular movement of the tape produces on the screen a running account of the ticker information which proceeds along the screen spasmodically and thus is not conducive to easy reading; in fact, the constant agitative motion of the image on the screen might fatigue the observer.

The main object of the present invention is to impart to the tape a continuous movement at a speed consistent with the effective operation of the recording device.

To produce the desired result the present invention contemplates the dispensation of the spacing mechanism of the recording device and a tape-actuating device is provided in accordance with the present invention whereby the tape is given a continuous motion during the recording operations and is arrested automatically upon the cessation of recording operations for a predetermined period.

In accordance with the present invention the projecting machine is interposed between the recording device and the tape actuating device, such that the tape is drawn through the printing zone of the recording device, thence immediately through the projector to the tape-engaging member of the tape actuator. It is, of course, manifest that the tape actuating device may be incorporated in the printing unit and operated therefrom by the same source of power, in which event the tape would be directed in the same manner as aforesaid except that it would be returned to the printing unit to engage the tape actuator therein.

The foregoing and further objects of the present invention will become apparent from the ensuing disclosure when considered in connection with the preferred embodiment thereof as illustrated in the drawing in which:

Fig. 1 is a schematic diagram illustrating the application of the present invention to a projection system.

Fig. 2 is a perspective view of the preferred embodiment of the invention supplemented by a fragmentary view of the selector or main operating shaft in a recorder and the electrical interconnections therefor.

Fig. 3 is a longitudinal sectional view of the main drive shaft and the mechanism thereon.

Fig. 4 is an elevational view of the retard-stop device.

In the general arrangement the projecting machine is preferably juxtapositioned to the recording device so as to reduce to an absolute minimum the time transpiring between the making of the record and the appearance of that record on the screen. The maintenance of a minimum distance between the recording device and the projector is highly desirable so as to preclude the possibility of delaying the presentation of the information upon the screen after the recording operation. If the projector is not so placed there is great likelihood that the information contained on the portion of the tape between the recorder and projector will be suppressed until such a time when further recordations are made which, in the event of an inactive market might not occur until after a considerable lapse of time.

As exemplified in Fig. 1, the tape supply is derived from a tape spool 11 located either interiorly or exteriorly of a printing unit 12 which may be of a type similar to that disclosed in Patent No. 1,745,633, issued February 4, 1930 to S. Morton et al. The tape 10 is passed over a platen 13 of the printing unit, thence through an adjacently disposed projector 14, from whence it passes over a tape guide 15, around a guide roller 16, through tape engaging means 17 to a reel 18 of a tape take-up device which is in the present embodiment located on the tape actuating device.

Directing attention to Fig. 2, which illustrates the tape actuating device, it is observed that this device comprises a motor 21 which is adapted to impart through a pinion 22 mounted on the armature shaft thereof continuous motion to a worm gear 23 carried on a main drive shaft 24 which is journaled in bearings mounted in brackets 25 and 26 supported on the base 20 of the tape actuating device.

A longitudinal sectional view of the main drive shaft and the mechanism carried thereon is shown in Fig. 3. The worm gear 23 is fixed to a flanged collar 27 which in turn is fixedly mounted on the drive shaft 24. Loosely mounted on the main drive shaft 24 is a sleeve member 28 integral with which is a ratchet 29. The end of the sleeve member 28 opposite the ratchet 29 is reduced in diameter to receive a gear 31 which is tightly held on sleeve 28 by means of nut 32 and locknut 33 mounted on the threaded portion of the sleeve. The end of the sleeve 28 adjacent to the nut 33 is provided with two diametrically disposed notches into which is received the rib of a disc member 34. Interposed between the disc 34 and a flanged collar 35 pinned to the main drive shaft 24 is a disc of friction material.

A disc 36 is keyed to the shaft 24 adjacent to the ratchet 29 and disposed between disc 36 and ratchet 29 is disc 37 of friction material. A helical compression spring 38 is carried on the drive shaft 24 between the collar member 27 and the disc member 36 and serves to compress discs 34 and 36 and sleeve 28 and the discs of friction material against the collar 35. Thus, it is seen that the sleeve member 28 is frictionally connected to the main drive shaft 24.

The ratchet wheel 29 cooperates with a yielding pawl member 41 as shown in Figs. 2 and 4. Pawl member 41 is slidably mounted on the side of an armature 42 associated with an electromagnet 43 which is carried on a mounting 44 which in turn is supported on a bracket 45. Armature 43 is pivoted at 46 to the mounting 44 and is normally urged in a clockwise direction against the ratchet wheel 29 (as viewed in Fig. 4) by a spring 47, when the magnet 43 is deenergized. As schematically shown in Fig. 2 the electromagnet 43 is electrically connected to a pair of contacts 48 so that it is energized when a circuit is established, upon the closing of contacts 48, from positive battery through contacts 48 thence over wire 49 and through the winding of electromagnet 43 to ground. The contacts 48 in the present embodiment are preferably located (though not necessarily) in the printing unit or recorder 14 and are controlled by a contact lever 51 cooperatively related to a cam 52 integral with sleeve 53 carried on the main operating shaft 54 of a printing unit of the type shown in the previously mentioned patent.

The present invention is designed to be employed with a printer or recorder which is selectively operated by means of equal length letter codes or equal length code combinations of signalling conditions or impulses, and in which the elements carried on the main operating shaft are adapted to make one complete revolution each time a character is to be printed. Printers of this type are operated on the "start-stop" principle, wherein each group of selecting or code impulses is preceded by a start impulse and followed by a stop impulse, the function of which primarily is to maintain unison between the transmitting apparatus and the printers. In effect then, a code combination of signalling impulses for all practical purposes may be deemed to comprise a start impulse, five or six code impulses (depending upon whether a five-unit or six-unit code is used) and a stop impulse. However, in normal transmission the code signals follow successively and continuously such that a definite time interval comprising a stop impulse and a start impulse exists between each letter code; thus the present invention contemplates the utilization of this time interval to effect the continuous movement of the tape.

As is well known, the sleeve member 53 makes one complete revolution during the reception of each code combination; that is, the cam member 52 makes one cyclic movement for each character printed. The position of cam 52 as shown in Fig. 2 is that assumed upon the completion of each cycle and in this position the contacts 48 are open and electromagnet 43 is deenergized. During the normal reception of the ticker information, the code combinations are received in uniform succession and since the printing stroke is practically instantaneous the recordation may be made upon a continuously moving tape without blurring or smudging. For this reason the spacing mechanism usually employed in printing devices of the type used in printing telegraph systems may be eliminated and a tape actuating device of the kind herein described, adapted to impart continuous movement to the tape, may be substituted therefor.

As previously described, the main shaft 24 is constantly rotating. However, the sleeve 28 frictionally carried thereon is held from rotation by the pawl 41 when there is a cessation in the reception of code signals at which time the magnet 43 is deenergized and armature 42 is released. When code signals are again received the cam 52 rotates substantially continuously whereupon the magnet 43 is again energized, but it is momentarily deenergized each time the cam portion passes underneath follower roller 55. Of course, upon this deenergization the armature 42 is released and pawl 41 engages the ratchet 29, but to compensate for this momentary deenergization so as not to affect or impede the continuous rotation of the ratchet 29, and hence the sleeve 28, the slidable connection between pawl 41 and armature 42 becomes effective.

The length of the slot 56 is so proportioned as to permit a period of engagement between the yieldable pawl member 41 and ratchet 29 which is slightly greater than the time interval between signal code combinations so that the pawl 41 approaches but does not reach a stop pin 57 on the armature 42 during such time interval. In this manner the pawl 41 is engaged with and withdrawn from the ratchet 29 in synchronism with the deenergization and reenergization of electromagnet 43 during the time interval between signal code combinations. The yieldability of pawl member 41 is promoted by a spring 58 distended between the laterally disposed lower end of pawl 41 and guide pin 59 integral with armature 42; so that, when the pawl 41 is disengaged or withdrawn from the ratchet 29 spring 58 will cause it to be thrust or protruded upwardly until the bottom of the slot 56 engages a guide pin 61 attached to armature 42.

Now, when the time interval between two successive signal code combinations is unduly prolonged either by a momentary delay or by a complete cessation of transmission, the period of deenergization of electromagnet 43 and also the period of engagement of pawl 41 with ratchet 29 will be correspondingly prolonged, in which event, the pawl member 41 will not be withdrawn as heretofore but will continue into engagement until it strikes against the stop pin 57, whereupon the rotation of the ratchet 29, and hence sleeve 28, will be arrested until the transmission of code signals shall have again been resumed.

Referring again to Fig. 2, the drive shaft 24 extends to the right (as viewed in Fig. 3) beyond the bracket 25 and carries on its end a grooved pulley 65 fixed thereto. A gear 66 adapted to mesh with the gear 31 is fixedly mounted on an auxiliary shaft 67 journaled in brackets 25 and 68. Shaft 67 extends beyond the bracket 68 and carries thereon a knurled roller 69 which comprises a part of the tape engaging means 17. A tape pressure means 71 which comprises a U-shaped portion 72 carried on a stud shaft 73 mounted in the bracket 68 is disposed above the roller 69. Loosely mounted on the stud shaft 74 and disposed between the arms of the member 72 is a pressure roller 75. The pressure means 71 is adapted to press against the roller 69 by means of a spring 76. A thumb portion 77 is provided should it be desired for some reason to effect manually the release of the pressure exerted by the roller 75 against the tape.

A flanged tape guide roller 78 is carried on the bracket 68 adjacent to the roller 69. The tape is passed underneath the guide roller 78, thence between the rollers 69 and 75 of the tape engaging means, then around the hub 79 of the reel 18 of the tape take-up device. As shown in Fig. 2, the reel 18 is, in the present embodiment, provided with a removable side 82 carried on a swinging arm 83 pivotally mounted on the base 26. Side 82 is adapted to be spring-held against the hub 79 by means of a spring 84. The swinging arm 83 is adapted to be swung outwardly until arrested by the abutting of lug 85 thereon with a stop lug 86 integral with the base. The purpose of the removable side 82 is to permit the ready removal of the used or printed tape from the reel without disturbing the continuous movement of the tape through the projection machine, since in the case of a very busy market the messages are received by the recorders continuously for many hours and hence the accumulation of printed tape may become greater than can be readily taken care of by the limited diameter of the take-up reel.

The tape reel is carried on the extended portion of the shaft 87 which is journaled in a bracket 88 secured on the base. The shaft 87 is also adapted to extend beyond the bracket 88 in a direction opposite to that portion upon which the reel 18 is supported and has affixed thereto a grooved pulley 89. The pulleys 65 and 89 are operatively connected by a belt 91 in such a manner that when the tape 10 is held taut between the tape engaging means and the reel the belt 91 will slip around the pulley 89, thus precluding the likelihood of severing the tape. For this purpose the belt 91 has been found to give best results when composed of a continuous helical spring, since its yieldability provides the utmost of protection to the tape against severance and compensates for increasing diameter of the paper wound on the reel 18.

In the employment of the tape actuating device of the present invention in the projection system schematically shown in Fig. 1, the tape actuating device is properly placed in the system so as to maintain the alignment of the tape 10 therethrough. The tape is properly introduced into the tape engaging means as previously described, the end of the tape being inserted into one or the other of the anti-slip grooves 92 in the hub 79. The tension of the spring 76 of the tape pressure means 71 is such as to insure a gripping contact between the pressure roller 75 and the knurled roller 69. The purpose of the take-up device 18 normally is to take up the slack in the tape existing between the tape engaging means and the tape reel and normally has no effect on the tape between the tape-engaging means 17 and the tape source 11. While the tape actuating mechanism itself is still arrested, the take-up device nevertheless is continually operative due to the fact that the pulley 65 is constantly rotating with the constantly rotating shaft 24 to which it is affixed. Due to the yieldability of belt 91 and its slippage on pulley 89 the danger of imparting undue tension on tape 10 is removed.

When the operation of the recording device or ticker 12 is initiated upon the reception of code signals to effect printing on the tape 10, the movement of the tape 10 for spacing is likewise initiated by the energization of electromagnet 43 which releases the ratchet wheel 29 for rotation. As previously observed, the energization of electromagnet 43 is effected by the closing of contact 48 through the coaction of lever 51 and cam 52. Now, as long as the signals are received in regular succession the continuous rotation of ratchet wheel 29 (and hence sleeve 28 and gear 31) will be uninterrupted by the periodic opening and closing of contact 48, as previously described, and continuous rotation will likewise be imparted to the auxiliary shaft 67 through gear 66 to impart through the tape engaging means 17 continuous movement to tape 10. In this manner, upon the regular and continuous reception of signals the tape 10 will be drawn smoothly through the recorder 12, at a rate controlled thereby, and projector 14 to produce upon the projection screen an easily readable running account of the information recorded on the tape. When the reception of signals ceases for any appreciable length of time, an interval greater than the time interval between code signals, the movement of the tape will automatically be arrested, since at the completion of the last cycle of operation of cam 52 the contact 48 will remain open and hence electromagnet 43 will be deenergized long enough for pawl 41 to effect the stoppage of ratchet 29, which occurs substantially simultaneously with the reception of the last code signal.

Manifestly, a tape actuating device has been provided which is responsive to code signalling and which produces a smooth and continuous movement to the tape. It is, of course, understood that the invention is capable of embodiment in many other forms than that specifically disclosed without departure from the spirit and scope of the invention as defined in the appended claims, or which may come within the range of equivalency.

What is claimed is:

1. In a tape actuator, a retarded-stop device comprising a normally moving element, an extensible member, means for operating said member to effect the engagement thereof with said element, and means carried by said member to establish a limited movement of said element after said engagement.

2. In a tape actuating apparatus, a retarded-stop device comprising a normally moving element, a yielding-stop member, means for operating said stop member to effect the engagement thereof with said element, and means carried by said member to establish a limited movement of said moving element after said engagement.

3. In a tape actuating apparatus, a retarded-stop device comprising a moving member, a stopping member, a protrusible element between said moving member and said stopping member, means for operating said stopping member and said element jointly to effect engagement of said element with said moving member, and means to establish a limited movement of said moving member after said engagement.

4. In combination with a tape actuator, a retarded-stop device comprising a moving element, an extensible member, means for operating said member to effect engagement thereof with said moving element, means operable in regularly recurring cycles for controlling said first means to establish a predetermined period of engagement of said member and said element during each cycle, and means to establish a limited movement of said element after said engagement upon cessation of operation of said cyclically operable means.

5. In a tape actuating device for imparting continuous movement to a tape through a printing telegraph machine, a first means in the printing machine operable cyclically, a second means in the tape actuating device comprising a first component and a second component, said first component adapted to control the operation of said second component, and means controlled by said first means acting directly on said first component for rendering said first component ineffective while said first means is operating in regularly recurring cycles.

6. In combination, a telegraph printing mechanism selectively responsive to received permutation code combinations of current impulses operative to record characters on a tape, and means for moving said tape continuously during the continued reception of current impulses including a yielding-stop device effective for establishing the continuance of said movement during a predetermined interruption of the current impulses.

7. In combination with a tape engaging device, means including a driving member and a driven member, means operable in regularly recurring cycles to control said first mentioned means to establish a predetermined period of coaction between said members during each cycle, and means carried by said first mentioned means operative upon cessation of operation of said cyclically operable means to effect an additional period of coaction to establish thereby the inaction of said driving member.

8. In combination, a telegraph printing mechanism selectively responsive to received permutation code combinations of current impulses operative to record characters on a tape, and means for moving said tape continuously and smoothly at a constant speed during the continued reception of current impulses including a yielding-stop means effective for controlling said movement during a predetermined interruption of the current impulses.

9. In a news exhibiting apparatus comprising a telegraph printing mechanism selectively responsive to received permutation code combinations of current impulses operative to record characters on a tape, means for moving said tape continuously during the continued reception of current impulses including an electromagnet energized during the reception of current impulses, and a yielding-stop means effective during a temporary deenergization of said electromagnet for controlling the continued movement of the tape.

10. In combination, a telegraph printing mechanism selectively responsive to received permutation code combinations of current impulses operative to record characters on a tape, and means for moving said tape continuously during the continued reception of current impulses including an electromagnet energized during the reception of current impulses, and a retarded-stop device embodying a yielding-stop instrumentality effective during a temporary deenergization of said electromagnet for controlling the continued movement of the tape.

11. In combination, a telegraph printing mechanism selectively responsive to received permutation code combinations of current impulses operative to record characters on a tape, and means for moving said tape continuously during the continued reception of current impulses including a yielding-stop member effective for controlling said movement during a predetermined interruption of the current impulses.

12. In a tape actuating apparatus, a retarded-stop device comprising a normally moving element, a yielding-stop member, electromagnetic means for operating said stop member to effect the engagement thereof with said element, and means carried by said member to establish a limited movement of said moving element after said engagement.

13. In combination with a tape actuating apparatus, a retarded-stop device comprising a moving member, a stopping member, a protrusible element between said moving member and said stopping member, means for operating said stopping member and said element jointly to effect engagement of said element with said moving member, means operable in regularly recurring cycles for controlling said first means to effect a predetermined period of engagement of said moving member and said element, and means to establish a limited movement of said moving member after said engagement upon cessation of operation of said cyclically operable means.

14. In combination, a recording device responsive to equal length letter codes and capable of printing upon a movable tape, a tape actuator comprising a tape-engaging means for controlling the movement of said tape through said recording device, a retarded-stop device in said actuator for controlling said tape-engaging means comprising a moving element, a yielding-stop member, means for operating said member to effect engagement thereof with said moving element, means in said recording device operable in cycles corresponding synchronously to said codes for controlling said first means to effect a predetermined period of engagement of said member and said element during each cycle, and means effective upon cessation of operation of said cyclically operable means to establish an additional period of engagement to effect the arrest of said moving element and said tape.

15. In a news exhibiting apparatus comprising a telegraph printing mechanism selectively responsive to received permutation code combinations of current impulses operative to record characters on a tape, means to impart continuous movement to said tape during continued reception of current impulses including a yielding-stop device, and electromagnetic means adapted to render said device effective for controlling said movement during a predetermined interruption of said current impulses.

16. In combination with a tape actuator, a retarded-stop device comprising a moving element, an extensible member, electromagnetic means for operating said member to effect engagement thereof with said moving element, means operable in regularly recurring cycles for controlling said first means to effect a predetermined period of engagement of said member and said element during each cycle, and means to establish a limited movement of said element after said engagement upon cessation of operation of said cyclically operable means to effect the inaction of said moving element.

17. In a tape actuator, a first member operable under certain operating conditions, a second member operable under other operating conditions, means operable in regularly recurring cycles for effecting a predetermined period of engagement of said first and said second members, and means to establish a supplemental period of engagement of said first member and said second member upon cessation of operation of said first mentioned means to arrest the operation of said first member.

18. In a projection system, a recorder responsive to equal length letter codes, a tape, a tape actuator adapted to impart continuous movement to said tape, said tape actuator comprising a first member normally operable continuously to effect the movement of said tape through said recorder, a second member operable to control the movement of said first member, means in said recorder operable in regularly recurring cycles corresponding synchronously to said codes adapted to control said second member to effect a predetermined period of engagement of said second member and said first member during each cycle, and means effective upon cessation of operation of said cyclically operable means to establish a supplemental period of engagement to effect the arrest of said first member and said tape.

19. In combination with a tape-engaging device, means comprising a first component operable under certain operating conditions and a second component operable under other conditions, means operable in regularly recurring cycles to control said first mentioned means to effect a predetermined period of interaction between said components during each cycle, and means effective upon cessation of operation of said cyclically operable means to establish an additional period of interaction to effect the inaction of said first component.

20. In a projection system, a recorder responsive to equal length letter codes adapted to make a record on a movable tape, a first means to project said record, a second means adapted to control the movement of said tape simultaneously through said recorder and said first means, said second means comprising a first component operable under certain operating conditions and a second component operable under other conditions, means operable in cycles corresponding synchronously to said codes to control said second means to effect a predetermined period of interaction between said components during each cycle, and means effective upon cessation of operation of said cyclically operable means to establish a supplemental period of interaction to effect the inaction of said first component to arrest the movement of said tape.

21. In combination, a telegraph mechanism selectively responsive to current impulses and operative to record characters on a tape, means for moving the tape continuously during the continued reception of current impulses, means operable concurrently with each complete operation of said mechanism and effective cyclically therewith for controlling the operation of said tape moving means, and mechanical means effective with said second mentioned means for establishing the continuance of the operation of said tape moving means for a predetermined period after said second mentioned means has lost its effectiveness.

22. In a tape actuating apparatus, a retarded-stop device comprising a normally moving element, means cooperating with said element for controlling its movement, an electromagnetic means for operating said means for rendering it ineffective with said element, and means effective following the deenergization of said electromagnetic means for establishing the cooperation of said means with said element to effect the limited movement of said element.

23. In a tape actuating apparatus, a retarded-stop device comprising a tape advancing element, means for driving said element continuously, an electromagnet energized periodically for controlling the continuous driving of said element, and a yielding-stop means effective following the deenergization of said electromagnet for establishing the continued driving of said element to a limited extent.

24. In combination, a telegraph mechanism selectively responsive to current impulses and operative to record characteris on a tape, means for moving the tape continuously during the continued reception of current impulses, a cam operated cyclically with said mechanism for controlling the operation of said tape moving means, and mechanical means effective with said cyclically operable cam for continuing the operation of said tape moving means for a predetermined period after said cyclically operable cam has lost its effectiveness.

25. In combination, a telegraph printing mechanism selectively responsive to received permutation code combinations of current impulses operative to record characters on a tape, a tape moving means, cam controlled means for controlling the operation of said tape moving means, and mechanical means effective with said cam controlled means for controlling the continued movement of the tape for a predetermined period after said cam controlled means has lost its effectiveness.

26. In combination, means for printing upon a record strip, means operable in each cycle of operation of said printing means, a continuously running motor, and mechanical means controlled by the second mentioned means for causing said motor to feed said strip, following a printing operation, a predetermined distance during a time of greater than a given duration wherein no subsequent printing operation occurs.

27. In combination, means for printing upon a record strip, a continuously running motor, means operable from and to normal position in each cycle of operation of said printing means, means for feeding said record strip, and mechanical means for causing said motor to operate said feeding means in response to operation of the second named means from normal position and for causing said feeding means to feed the record strip through a predetermined extent following the return of said second named means to normal position during a time of greater than a given duration wherein no subsequent printing operation occurs.

28. In combination, means for printing upon a record strip, a continuously running motor, and control means correlated with said printing means for causing said motor to feed said strip following a printing operation an additional amount whenever a succeeding printing operation fails to take place within a predetermined time, said control means comprising a member shiftable into position for operation by said motor at the end of a printing cycle.

29. In combination, means for printing upon a record strip, a continuously running motor, an element movable in each cycle of operation of the printing means, and control means correlated with said element for causing said motor to feed the record strip continuously throughout a succession of printing operations the time intervals between which are less than a given duration and for insuring feeding of said strip by said motor a predetermined distance after completion of a printing operation during a time of greater duration wherein no subsequent operation occurs, said control means comprising a member operable by said motor and a stop element limiting the extent of movement of said member.

30. In combination, means for printing upon a record strip, an element movable in each cycle of operation of said printing means, strip feeding means, control means responsive to movement of said element in a printing cycle for bringing said feeding means into action and for insuring continuation of the feeding means sufficiently to feed the strip a predetermined distance following completion of said printing cycle, said control means comprising a member movable by said element into and out of position for operation by said feeding means in each printing cycle.

31. In combination, means for printing upon a record strip, an element movable away from and back to its normal position in each cycle of operation of said printing means, strip feeding means, a continuously running motor, and control means responsive to movement of said element from normal position for causing said motor to operate said feeding means and to continue feeding said strip a predetermined distance after the return of said element to its normal position, said control means comprising a member movable by said motor and a stop element preventing movement of said member beyond a predetermined extent.

32. In combination, a ticker adapted to print characters successively on a record strip in successive cycles of operation, record strip feeding means, and control means correlated with said ticker for controlling said feeding means to cause said record strip to be fed continuously through a series of cycles of operation of said ticker wherein characters constituting a complete quotation are printed and for insuring feeding of said strip an additional extent immediately following the printing thereof, said control means comprising a member shiftable into and out of position for operation by said feeding means, and a stop element preventing movement of said member beyond a predetermined extent.

33. In combination, means for printing upon a record strip, means for feeding said record strip, means constantly tending to operate said feeding means, a member shiftable into and out of operative relation to said feeding means, and means correlated with said printing means for controlling said member, and a stop element so related to said member as to be engaged thereby after movement thereof with said feeding means through a predetermined extent.

34. In combination, means for printing upon a record strip, means for feeding said record strip, a member driven by said feeding means, an element connectable to said member, means correlated with said printing means for connecting said element with said member at the end of a printing cycle, a projection carried by said element, a stop member engageable by said projection upon operation of said element a predetermined extent by the first mentioned member for blocking operation of said feeding means, and spring means for returning said projection into a predetermined spaced relation from said stop member upon disengagement of said element from the first mentioned member.

WALTER J. ZENNER.